United States Patent
Yoon et al.

(10) Patent No.: US 10,231,277 B2
(45) Date of Patent: Mar. 12, 2019

(54) APPLICATION LAYER REQUEST PROCESSING DEVICE AND METHOD USING MULTIPLE INTERFACES IN ELECTRIC DEVICE

(71) Applicant: Samsung Electronics Co., Ltd., Suwon-si, Gyeonggi-do (KR)

(72) Inventors: Kang-Jin Yoon, Seoul (KR); Jiangwei Xu, Suwon-si (KR); Jin-Ho Lee, Seoul (KR); Yong-Seok Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 220 days.

(21) Appl. No.: 15/119,277

(22) PCT Filed: Feb. 17, 2015

(86) PCT No.: PCT/KR2015/001654
§ 371 (c)(1),
(2) Date: Aug. 16, 2016

(87) PCT Pub. No.: WO2015/122750
PCT Pub. Date: Aug. 20, 2015

(65) Prior Publication Data
US 2017/0013665 A1 Jan. 12, 2017

(30) Foreign Application Priority Data
Feb. 17, 2014 (KR) .................. 10-2014-0017807

(51) Int. Cl.
*G06F 15/16* (2006.01)
*H04W 76/19* (2018.01)
(Continued)

(52) U.S. Cl.
CPC ............. *H04W 76/19* (2018.02); *G06F 9/54* (2013.01); *G06F 11/14* (2013.01);
(Continued)

(58) Field of Classification Search
CPC .... H04L 29/0652; H04L 29/08576–29/08612;
(Continued)

(56) References Cited

U.S. PATENT DOCUMENTS 5,608,720 A * 3/1997 Biegel .................... H04J 3/1611
370/249
8,233,385 B1 * 7/2012 Bayareddy .......... H04L 12/2859
370/225
(Continued)

FOREIGN PATENT DOCUMENTS

| CN | 1791168 A | 6/2006 |
| CN | 101772147 A | 7/2010 |
| WO | 2007040332 A1 | 4/2007 |

OTHER PUBLICATIONS

Bernaschi et al.; Seamless Internetworking of WLANS and Cellular Networks: Architecture and Performance Issues in a Mobile IPv6 Scenario; Toward Seamless Internetworking of Wireless LAN and Cellular Networks; IEEE Wireless Communications; Jun. 2005.
(Continued)

*Primary Examiner* — Brendan Y Higa
(74) *Attorney, Agent, or Firm* — Jefferson IP Law, LLP

(57) ABSTRACT

The present invention is to process a request of an application layer in an electronic device, and a method for operating the electronic device comprises transmitting a request signal through a first interface, and, when a response signal corresponding to the request signal is not received before a timer expires, retransmitting another request signal through a second interface. The request signal and the another request signal correspond to a single request signal generated in the electronic device. Also, the present invention includes other embodiments than the described embodiments.

18 Claims, 13 Drawing Sheets

(51) Int. Cl.
*H04W 76/38* (2018.01)
*H04L 29/12* (2006.01)
*H04L 29/08* (2006.01)
*G06F 9/54* (2006.01)
*G06F 11/14* (2006.01)
*H04W 4/20* (2018.01)
*H04W 80/06* (2009.01)
*H04W 84/12* (2009.01)
*H04W 88/06* (2009.01)

(52) U.S. Cl.
CPC .. *H04L 29/08585* (2013.01); *H04L 29/08612* (2013.01); *H04L 61/6077* (2013.01); *H04L 67/141* (2013.01); *H04W 4/20* (2013.01); *H04W 76/38* (2018.02); *H04W 80/06* (2013.01); *H04W 84/12* (2013.01); *H04W 88/06* (2013.01)

(58) Field of Classification Search
CPC .... H04L 29/08945–29/08963; H04L 61/6077; H04L 67/14–67/145; H04L 67/32–67/325; H04W 76/10; H04W 76/15; H04W 76/18–76/19; H04W 76/30; H04W 76/38; H04W 80/06; H04W 80/08; H04W 80/10; H04W 84/12; H04W 88/06
See application file for complete search history.

(56) References Cited

U.S. PATENT DOCUMENTS

| | | | | |
|---|---|---|---|---|
| 8,270,369 | B1* | 9/2012 | Chang | H04W 36/02 370/254 |
| 8,391,907 | B1* | 3/2013 | Cocos | H04W 48/16 370/310 |
| 8,614,990 | B1 | 12/2013 | Mistry et al. | |
| 9,955,412 | B2* | 4/2018 | Weksler | H04W 48/18 |
| 2004/0077374 | A1 | 4/2004 | Terry | |
| 2005/0201353 | A1 | 9/2005 | Lee et al. | |
| 2006/0080456 | A1 | 4/2006 | Hur et al. | |
| 2006/0128374 | A1 | 6/2006 | Wessel Van Rooyen | |
| 2006/0182025 | A1 | 8/2006 | Kim et al. | |
| 2009/0279633 | A1* | 11/2009 | Lee | H04L 1/0643 375/267 |
| 2010/0056230 | A1* | 3/2010 | Chan | H04W 52/0264 455/574 |
| 2010/0325301 | A1 | 12/2010 | Kwon et al. | |
| 2010/0332665 | A1* | 12/2010 | Jolfaei | H04L 67/141 709/228 |
| 2011/0222404 | A1 | 9/2011 | Watson et al. | |
| 2011/0307546 | A1* | 12/2011 | Iovene | H04L 45/00 709/203 |
| 2013/0247164 | A1* | 9/2013 | Hoggan | H04W 12/06 726/8 |
| 2014/0281019 | A1* | 9/2014 | Maltz | H04L 45/00 709/235 |
| 2014/0297818 | A1* | 10/2014 | Loewenthal | H04L 61/2015 709/221 |
| 2014/0362765 | A1* | 12/2014 | Biswas | H04W 76/026 370/328 |
| 2015/0045021 | A1* | 2/2015 | Schlatter | H04W 48/20 455/434 |
| 2017/0289866 | A1* | 10/2017 | Watfa | H04W 36/0033 |

OTHER PUBLICATIONS

Bae et al.; Handover Triggering Mechanism Based on IEEE 802.21 in Heterogeneous Networks with LTE and WLAN; IEEE; Jan. 2011.
"App coverage—rethinking network performance for smartphones", Sep. 2013.
Bae et al.;Handover Triggering Mechanism Based on IEEE, 802.21 in Heterogeneous Networks with LTE and WLAN, Year: 2011.
Bernaschi et al.; Seamless internetworking of WLANs and cellular networks, Jun. 2005.

* cited by examiner

APPLICATION LAYER REQUEST PROCESSING DEVICE AND METHOD USING MULTIPLE INTERFACES IN ELECTRIC DEVICE

CROSS-REFERENCE TO RELATED APPLICATION(S)

This application is a U.S. National Stage application under 35 U.S.C. § 371 of an International application filed on Feb. 17, 2015 and assigned application number PCT/KR2015/001654, which claimed the benefit of a Korean patent application filed on Feb. 17, 2014 in the Korean Intellectual Property Office and assigned Serial number 10-2014-0017807, the entire disclosure of which is hereby incorporated by reference.

TECHNICAL FIELD

The present invention relates to application layer request processing in an electronic device.

BACKGROUND ART

For a user to utilize or consume contents of a server through an application, a request from an application layer is transmitted to the server and a response from the server is transmitted to an electronic device. When the electronic device includes a plurality of interfaces for communication, the request and the response are transmitted and received through a basic interface.

FIG. 1 illustrates signal exchange for processing a request of an application layer in an electronic device. Referring to FIG. 1, in step 101, an application 112 of the electronic device 110 transmits the request of the application layer to a request/response handler 114. In this case, the application 112 sets a waiting time for the response to the request to arrive, and waits for the response. In step 103, the request is transferred to a first interface 124 which is designated as a basic interface. In step 105, the first interface 124 transmits the request to a server 170. When the first interface 124 is a means for cellular communication, the request may be transmitted over a cellular network. Next, in step 107, the server 170 transmits a response corresponding to the request. In step 109, the first interface 124 receives and transfers the response to the request/response handler 114. In step 111, the request/response handler 114 provides the response to the application 112.

In the procedure illustrated at FIG. 1, since the response arrives within the waiting time, the response may be processed normally in the application 112. However, when the response does not arrive within the waiting time due to a problem (e.g., Input Output (IO) Exception occurrence due to a disconnection, interface speed degradation, network congestion, server congestion, etc.) of the basic interface or the network used by the basic interface, timeout may occur.

When the timeout may occur in the following cases. For example, when the electronic device moves to a place of high communication (e.g., wireless Local Area Network (LAN), cellular) signal attenuation and maintains an existing interface until it recognizes disconnection even though signals are weak, the timeout may occur. For example, when accessing a dummy Access Point (AP), the timeout may occur. For example, when a network throughput temporarily reduces because users of the network related to the basic interface abruptly increase, the timeout may occur. For example, the timeout may occur due to server delay, malfunction, and so on.

As stated above, the timeout for the request of the application layer may occur by various reasons. When the timeout occurs, the application may retransmit the request or display a screen notifying that the request is not properly executed. Although the request is retransmitted, the timeout may occur again. Also, even when the retransmitted request is successfully processed, a service delay occurs. Hence, the user may experience great inconvenience in using the service. That is, due to the timeout or the service delay, Quality of Experience (QoE) of the user declines. Thus, it is necessary to suggest an alternative for effectively processing the request of the application layer.

DISCLOSURE OF INVENTION

Technical Problem

One embodiment of the present invention provides an apparatus and a method for effectively processing a request of an application layer in an electronic device.

Another embodiment of the present invention provides an apparatus and a method for providing a seamless Internet service in an electronic device.

Yet another embodiment of the present invention provides an apparatus and a method for enhancing responsiveness of an Internet service in an electronic device.

Still another embodiment of the present invention provides an apparatus and a method for repeatedly transmitting a request of an application layer using multiple interfaces in an electronic device.

A further embodiment of the present invention provides an apparatus and a method for determining a timer value to determine repeated transmission of a request of an application layer in an electronic device.

A further embodiment of the present invention provides an apparatus and a method for changing a basic interface in an electronic device.

Solution to Problem

A method for operating an electronic device according to an embodiment of the present invention includes transmitting a request of an application layer through a first interface, and, when not receiving a response corresponding to the request transmitted through the first interface before a timer expires, retransmitting the request of the application layer through a second interface, wherein the request transmitted through the first interface and the request transmitted through the second interface are for a single request generated in an application.

An electronic device according to another embodiment of the present invention includes a communication unit comprising a first interface for accessing a first network and a second interface for accessing a second network, wherein the communication unit transmits a request of an application layer through the first interface, and, when not receiving a response corresponding to the request transmitted through the first interface before a timer expires, retransmits the request of the application layer through the second interface, and the request transmitted through the first interface and the request transmitted through the second interface are for a single request generated in an application.

A method for operating an electronic device according to an embodiment of the present invention includes transmitting a request signal through a first interface, and, when a response signal corresponding to the request signal is not received before a timer expires, transmitting another request signal through a second interface, and the request signal and the another request signal correspond to a single request generated in the electronic device.

An electronic device according to another embodiment of the present invention includes a transceiver comprising a first interface for accessing a first network and a second interface for accessing a second network, wherein the transceiver is configured to transmit a request signal through the first interface, and, when a response signal corresponding to the request signal is not received before a timer expires, transmit another request signal through the second interface, and the request signal and the another request signal correspond to a single request generated in the electronic device.

Advantageous Effects of Invention

By retransmitting the request of the application layer using another interface, the electronic device may secure stability using the multiple interfaces and enhance service responsiveness.

BEST MODE FOR CARRYING OUT THE INVENTION

Hereinafter, an operational principle of the present invention will be described in detail with reference to the accompanying drawings. In the following description, well-known functions or constitutions will not be described in detail if they would unnecessarily obscure the invention. Also, terminologies to be described below are defined in consideration of functions in the present invention and may vary depending on a user's or an operator's intention or practice. Thus, their definitions should be defined based on all the contents of the specification.

Hereinafter, the present invention describes a technique for processing a request using multiple interfaces in an electronic device.

Terms for identifying messages used in the following explanation, terms for identifying timers, and terms for indicating network entities are for the sake of explanations. Accordingly, the present invention is not limited the terms to be described, and may use other terms indicating objects having technically identical meaning.

Figure 1:
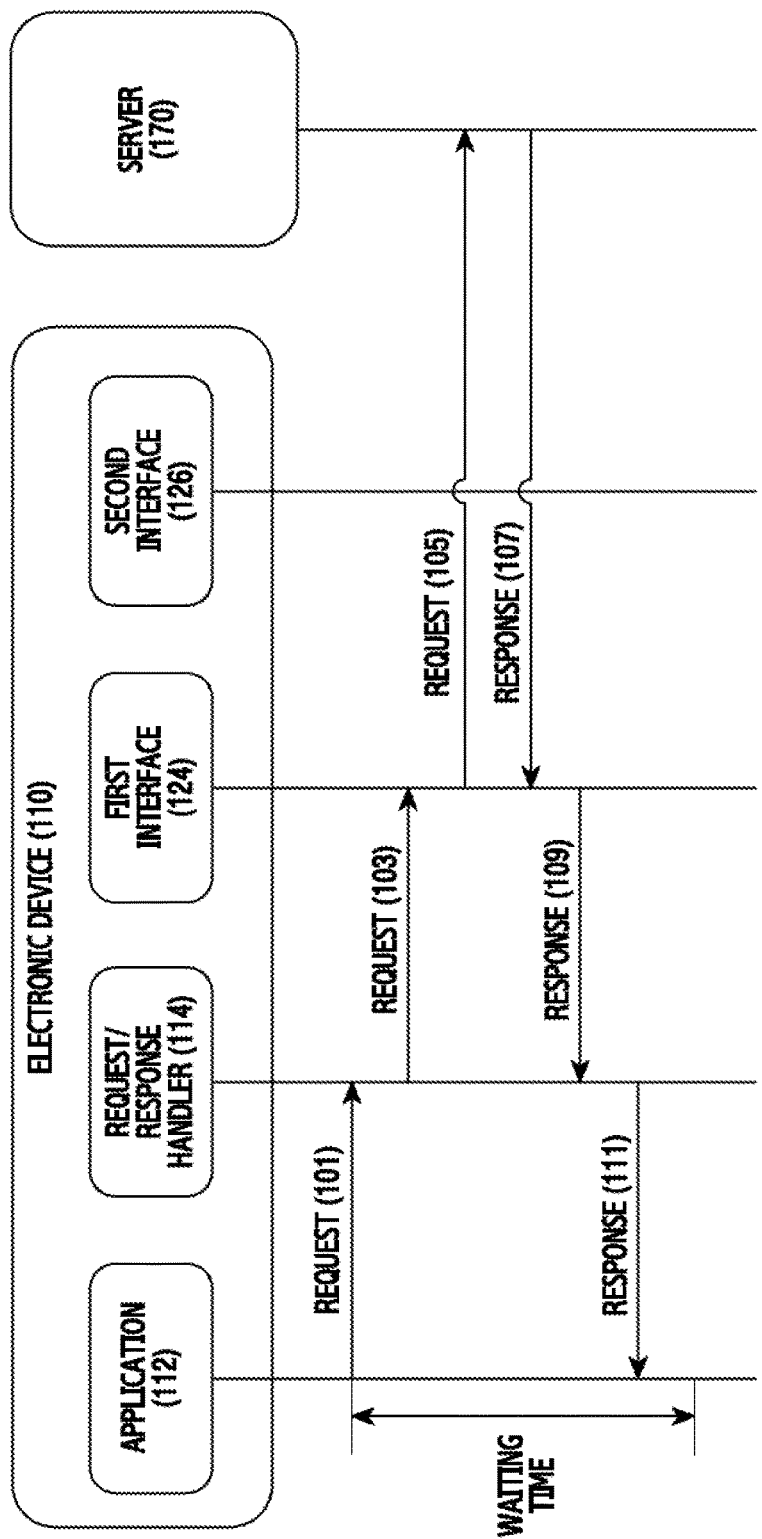
FIG. 1 illustrates signal exchange for processing a request of an application layer in an electronic device.
Figure 2:
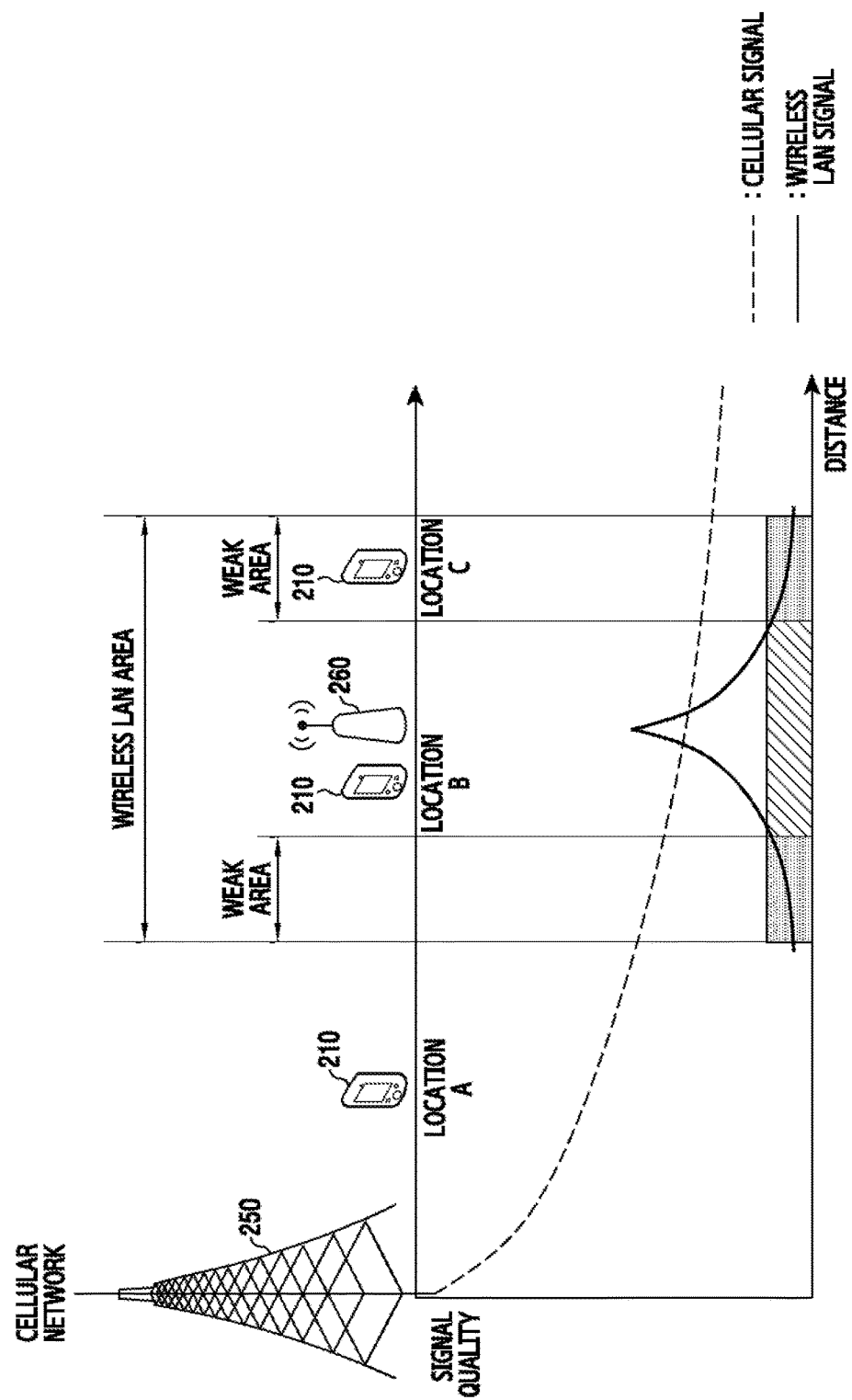
FIG. 2 illustrates an example of signal quality change per location of an electronic device according to an embodiment of the present invention.

FIG. 2 illustrates an example of signal quality change per location of an electronic device according to an embodiment of the present invention.

Referring to FIG. 2, the electronic device 210 may be located in a region where a cell of a base station 250 of a cellular network and coverage of an AP 260 of a wireless LAN overlap. The electronic device 210 includes a plurality of communication interfaces, and the communication interfaces include an interface for accessing the cellular network and an interface for accessing the wireless LAN.

When the electronic device 210 is located at a location A, a signal quality of the cellular network is relatively good and thus the electronic device 210 may perform communication over the cellular network. When the electronic device 210 moves to a location B, a signal quality of the wireless LAN is better. Accordingly, when a basic interface of the electronic device 210 is the interface for the wireless LAN, the electronic device 210 performs the communication via the AP 260, that is, transmits a request of an application layer. Next, when the electronic device 210 moves to a location C, it belongs to the coverage of the wireless LAN but the signal quality of the cellular network is relatively better. However, when the electronic device 210 maintains the basic interface, it transmits the request over the wireless LAN having the relatively poor signal quality.

At the location C, the request transmission over the wireless LAN having the relatively poor signal quality may cause occurrence of processing delay or timeout. Even in different situations from the location C, the single interface maintained may cause the occurrence of the processing delay or the timeout for several reasons.

Hence, various embodiments of the present invention provide a method for retransmitting a request using the multiple interfaces in the electronic device 210. That is, the electronic device 210 may transmit a request through one interface, and then, when not receiving a response within a certain time, retransmit the request through another interface. In this case, the certain time may be shorter than a waiting time defined to declare the timeout.

Figure 3:
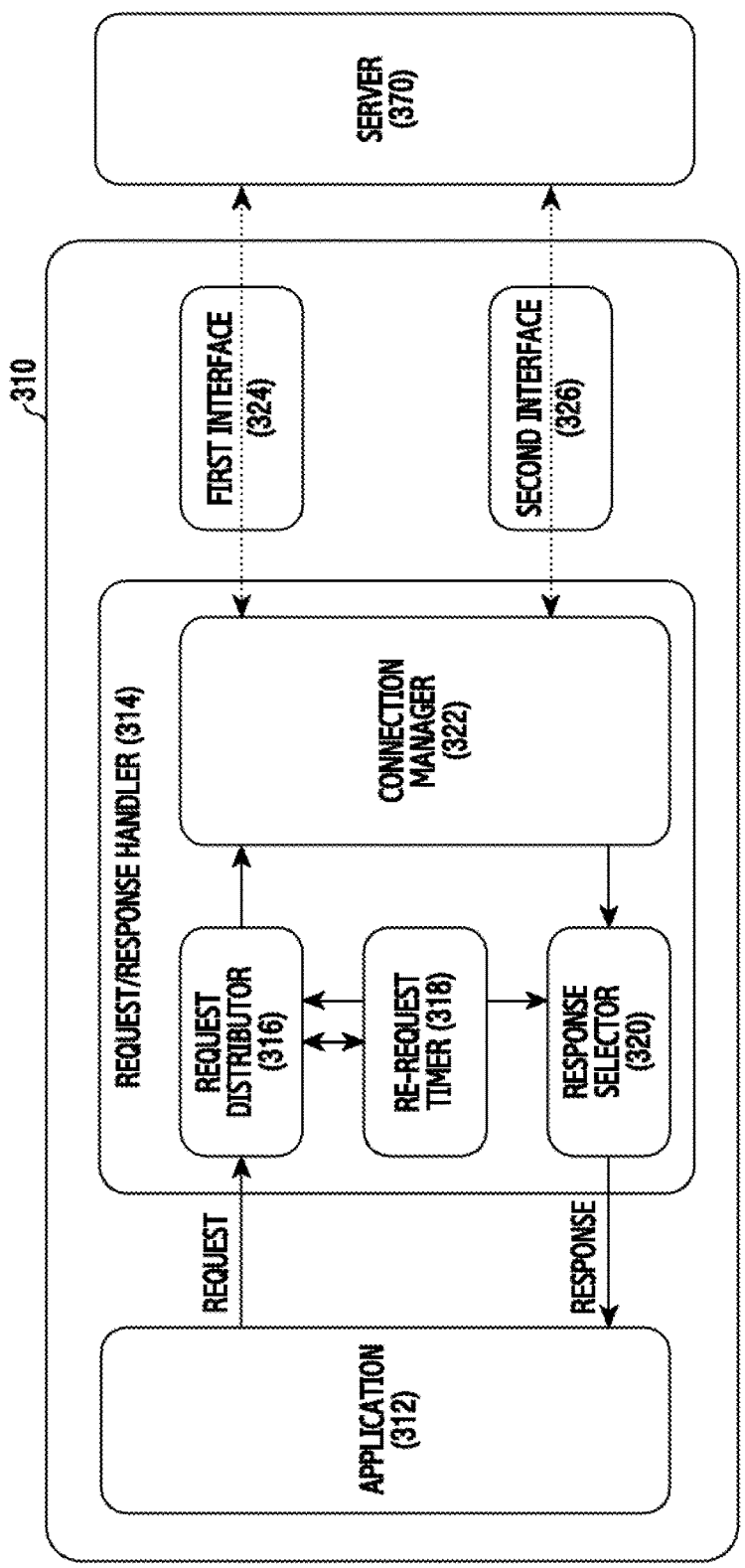
FIG. 3 illustrates a functional structure of an electronic device according to an embodiment of the present invention.

FIG. 3 illustrates a functional structure of an electronic device according to an embodiment of the present invention. FIG. 3 illustrates a logical structure of the electronic device 210 of FIG. 2.

Referring to FIG. 3, the electronic device 310 may transmit a request to a server 370 and receive a response. The electronic device 310 includes an application 312, a request/response handler 314, a first interface 324, and a second interface 326.

The application 312, which is a program of an application layer, generates a request of the application layer and processes a response. For example, the request may include a content (e.g., Hyper Text Markup Language (HTML), image, etc.) request according to Hyper Text Transfer Protocol (HTTP), a file transfer request according to File Transfer Protocol (FTP), and so on. The response may include contents or a file corresponding to the request. The application 312 may be initially installed on the electronic device 310 or installed by a user.

The request/response handler 314 transmits the request generated by the application 312 to the server 370 through the first interface 324 and the second interface 326, and transfers a response received from the server 370 to the application 312. The request/response handler 314 may include a request distributor 316, a re-request timer 318, a response selector 320, and a connection manager 322.

The request distributor 316 interrupts a request and transfers a corresponding request to a particular interface. And, the response selector 320 determines the interface to which the request is transferred, by comparing a reception time per interface transferred. When a response is not received during a certain time, the re-request timer 318 instructs the request distributor 316 to retransmit the request through other interface. Hereafter, to ease the understanding, the certain time for generating the retransmission is referred to as a re-request timer value.

The response selector 320 selects one of responses for the same request. More specifically, when a plurality of responses to the same request is received through the multiple interfaces, the response selector 320 transfers a first arrived response to the application 312. The response selector 320 provides the reception time of each response received through the interfaces to the request distributor 316.

The connection manager 322 controls the multiple interfaces, that is, the first interface 324 and the second interface 326. In other words, the connection manager 322 activates the first interface 324 and the second interface 326 so as to use the multiple interfaces at the same time, and transfers the request to a designated interface so that the request provided from the request distributor 316 is transmitted through the designated interface.

The first interface 324 and the second interface 326 are communication means for communicating with the outside. For example, the first interface 324 and the second interface 326 may include a modem. The first interface 324 and the second interface 326 may provide an interface for wired communication or wireless communication. For example, the first interface 324 may be a means for accessing the wireless LAN, and the second interface 326 may be a means for accessing the cellular network. One of the first interface 324 and the second interface 326 is designated as the basic interface.

The certain time managed by the re-request timer 318 is set to a value smaller than a waiting time $T_R$ for the application 312 to declare the timeout. The certain time may be expressed as Equation 1 using a dynamic parameter $\alpha$.

$$T_{re}=T_R\times\alpha \ \alpha\in[0,1], \alpha\in R \qquad \text{[Equation 1]}$$

In Equation 1, $T_{re}$ denotes the re-request timer value, $T_R$ denotes the waiting time defined to declare the timeout, $\alpha$ denotes the dynamic parameter for determining the re-request timer value, and R denotes a real number set. As shown in Equation 1, $\alpha$ is defined as a real number greater than 0 and smaller than 1.

In an embodiment of Equation 1, the re-request timer value is defined as the product of the waiting time defined to declare the timeout and the parameter. However, according to another embodiment of the present invention, the re-request timer value may be defined as a difference between the waiting time defined to declare the timeout and the parameter. According to yet another embodiment of the present invention, the re-request timer value may be defined as a separate value regardless of the waiting time defined to declare the timeout.

Figure 4:
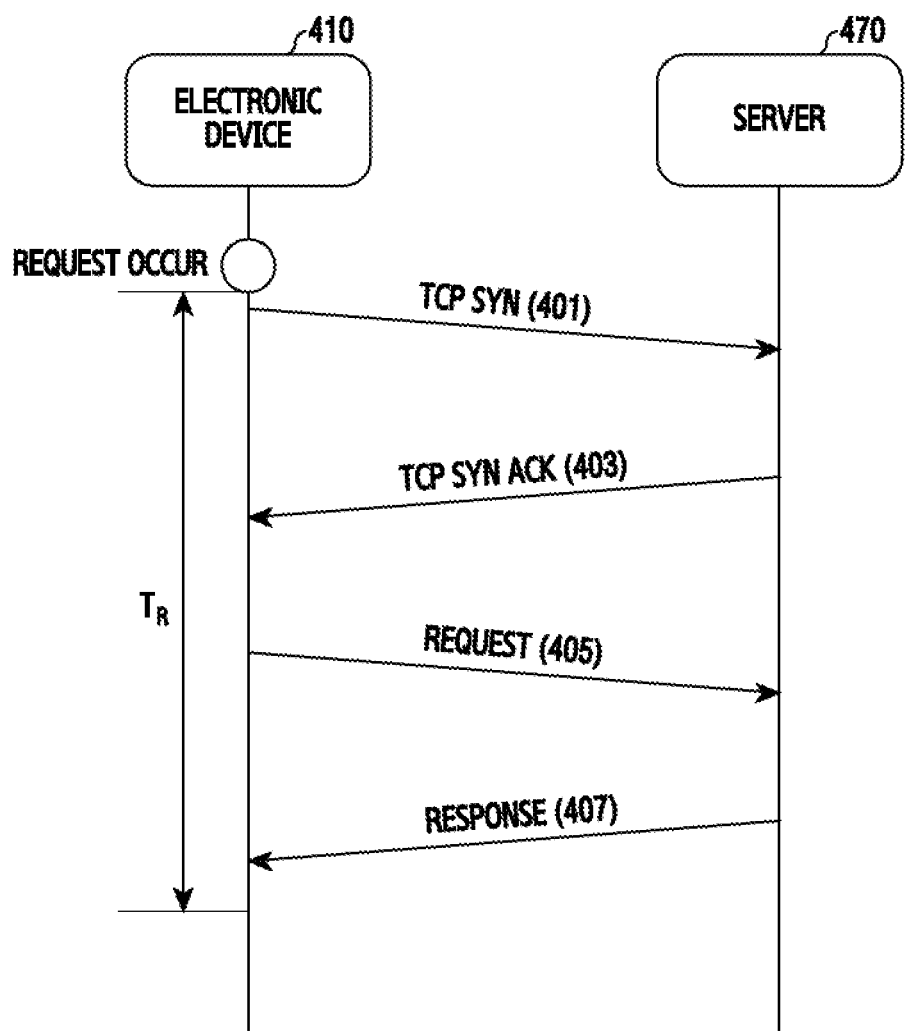
FIG. 4 illustrates signal exchange for a request and a response in an electronic device according to an embodiment of the present invention.

The re-request timer 318 may be configured as a plurality of timers. For example, when connection establishment of other protocol is required for the request transmission, the multiple timers may be set. HTTP may be used based on Transmission Control Protocol (TCP). In this case, the transmission of the request and the response may be performed as shown in FIG. 4. FIG. 4 illustrates signal exchange for a request and a response in an electronic device according to an embodiment of the present invention. Referring to FIG. 4, an electronic device 410 transmits a TCP Synchronization (SYN) signal in step 401, and a server 470 establishes a TCP connection using TCP SYN Acknowledge (ACK) in step 403. Next, the electronic device 410 may transmit a request in step 405, and the server 470 may transmit a response in step 407. Since the TCP connection procedure may fail in FIG. 4, a timer for the TCP connection procedure and a timer for a next request-response procedure may be set individually.

When the multiple timers are set, values of the timers may be expressed as Equation 2.

$$T_{re1}=T_R\times\alpha_1 \ \alpha_1\in[0,1], \alpha_1\in R$$

$$T_{re2}=T_R\times\alpha_2 \ \alpha_2\in[0,1], \alpha_2\in R \qquad \text{[Equation 2]}$$

In Equation 2, $T_{re1}$ denotes the timer value for the TCP connection, $T_{re2}$ denotes the timer value for the request-response procedure, $T_R$ denotes the waiting time defined to declare the timeout, $\alpha_1$ denotes a dynamic parameter for determining the timer value for the TCP connection, $\alpha_2$ denotes a dynamic parameter for determining the timer value for the request-response procedure, and R denotes a real number set. As shown in Equation 2, $\alpha_1$ and $\alpha_2$ are defined as a real number greater than zero and smaller than 1. That is, $\alpha_1$ is the parameter for the timer which transmits the SYN signal and waits for ACK for the TCT connection before a request is transmitted to the server, and $\alpha_2$ is the parameter for the timer which transmits the request and awaits the response. Herein, a, may be greater than $\alpha_1$.

Generally, $T_R$ for declaring the timeout is defined as about 30 seconds in a HTTP library. However, experimentally or statistically, when a response is not loaded within 10 seconds, the service may be handled that it is not normally provided. Hence, according to various embodiments of the present invention, the dynamic parameters $\alpha$, $\alpha_1$, and $\alpha_2$ may be set to generate the re-request within 10 seconds. For example, $\alpha_1$ and a, may be set such that the timer value for the TCP connection becomes 1 second and the timer value for the request-response procedure becomes 5 seconds. For example, when $T_R$ is 30 seconds, $\alpha_1$ may be set to ⅒ and $\alpha_2$ may be set to ⅙.

The parameter $\alpha$ for determining the timer value of the re-request timer 318 may vary according to a characteristic and a current state of the application 312 which generates the request. When the application 312 requires fast responsiveness, the electronic device 310 may raise the responsiveness by setting the value $\alpha$ to a small value. For example, in case of a streaming requiring realtime, when data remaining in a buffer for playback is exhausted within the time $T_R$ and a probability that the playback is interrupted increases, the electronic device 310 may enhance the responsiveness and prevent image with seams by setting the value α to a smaller value. For example, the value α considering the data remaining in the buffer may be expressed as Equation 3.

$$B(t)/P(t) > T_R \times \alpha + T_{rep}$$  [Equation 3]

In Equation 3, B(t) denotes a data amount remaining in the buffer, P(t) denotes, as a playback rate, a data consumption rate per time, $T_R$ denotes the waiting time defined to declare the timeout, α denotes the dynamic parameter for determining the re-request timer value, and $T_{rep}$ denotes an average response speed of another interface.

According to another embodiment of the present invention, to maximize the responsiveness, the electronic device 310 may set the value α to zero and thus transmit the same request through the multiple interfaces at the same time.

According to yet another embodiment of the present invention, the electronic device 310 may selectively set the predefined value α according to an application type. For example, as for an application which provides a realtime service, the value α may be smaller than the application which provides a non-realtime service. For example, the values α corresponding to application types may be defined as shown in Table 1.

TABLE 1

| Application type | $T_R \times \alpha$ [sec] |
|---|---|
| Web browsing | 10 |
| File download | 20 |
| Video streaming | 5 |
| . | . |
| . | . |
| . | . |

According to still another embodiment of the present invention, to enhance the responsiveness in a shadow area of a particular interface (e.g., the wireless LAN), the electronic device 310 may determine the value α based on Received Signal Strength Indicator (RSSI). Generally, as the RSSI is low, the response is likely to be slow. Hence, the electronic device 310 may set a smaller α value as the RSSI is low, and thus rapidly retransmit the request through another interface. For example, the values α corresponding to the RSSI may be defined as shown in Table 2.

TABLE 2

| RSSI [dBm] | $T_R \times \alpha$ [sec] |
|---|---|
| greater than or equal to −60 | 30 |
| smaller than −60, greater than or equal to −75 | 15 |
| smaller than −75, greater than or equal to −83 | 5 |
| smaller than −83 | 0 |

Table 2 is defined based on the RSSI. The RSSI is an example of the channel quality and may be replaced by another expression indicating the channel quality. For example, the channel quality may be presented using Signal to Noise Ratio (SNR), Carrier to Interference and Noise Ratio (CINR), Signal to Interference and Noise Ratio (SINR), and so on.

As mentioned above, the re-request timer value may be defined as the combination (e.g., multiplication, subtraction) of the waiting time defined to declare the timeout and the set parameter α. Herein, the set parameter may be determined based on at least one of a request purpose, an application type, a current state of a service relating to the application, and the channel quality of the network of the first interface which is the basic interface. Hence, since the set parameter directly affects the re-request timer value, the re-request timer value also may be determined based on at least one of the request purpose, the application type, the current state of the service relating to the application, and the channel quality of the network of the first interface which is the basic interface.

Figure 5:
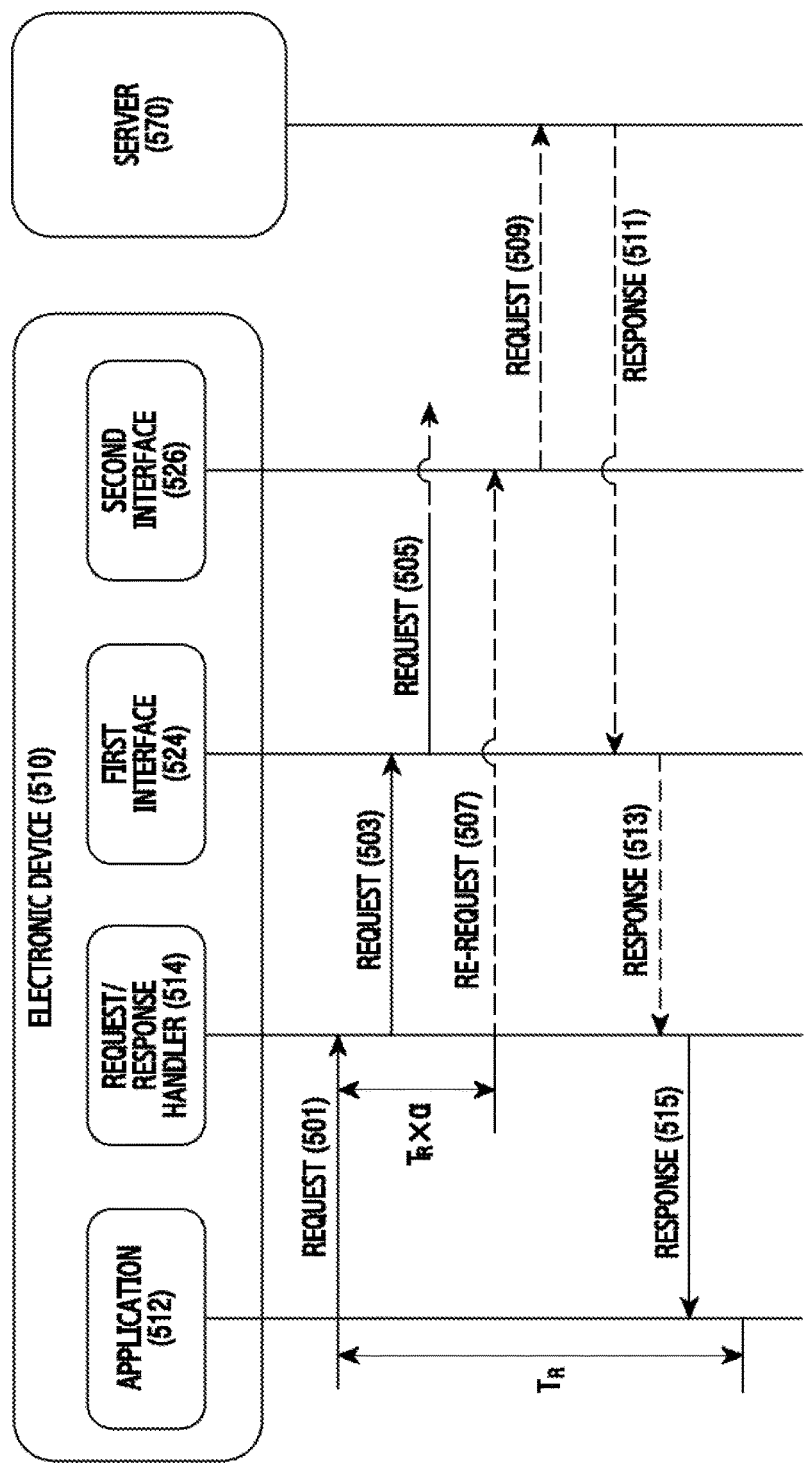
FIG. 5 illustrates signal exchange for processing a request using multiple interfaces in an electronic device according to an embodiment of the present invention.

FIG. 5 illustrates signal exchange for processing a request using multiple interfaces in an electronic device according to an embodiment of the present invention.

Referring to FIG. 5, in step 501, an application 512 of the electronic device 501 generates a request and transfers the request to a request/response handler 514. In this case, a re-request timer value is counted. The re-request timer value may be expressed as the product of the waiting time for declaring the timeout and the parameter for the re-request. Hereafter, to ease the understanding, the timer for counting the waiting time to declare the timeout is referred to as a response timer. That is, the re-request timer value is determined as the product of the response timer value $T_R$ and the parameter α.

In step 503, the request/response handler 514 transfers the request to the first interface 524. That is, the first interface 524 is the basic interface of the electronic device 510. For example, the first interface 524 may be a means for accessing the wireless LAN.

In step 505, the first interface 524 transmits the request. For example, the first interface 524 converts the request to a physical signal and then transmits to the outside so as to transfer to the server 570. In the embodiment of FIG. 5, the request transmitted in the step 505 may not be transferred to the server 570 due to various failure situations (e.g., channel quality degradation, network congestion, etc.). Alternatively, the request may be transferred to the server 570 over a wireless LAN network and a core network.

In step 507, the request/response handler 514 transfers a re-request to the second interface 526. For example, the second interface 526 may be a means for accessing the cellular network. That is, since a response to the request transmitted through the first interface 524 is not received until the re-request timer expires, the request is retransmitted. In this case, the request of the step 503 and the re-request of the step 507 originate from the singe request generated by the application 512 in the step 501.

In step 509, the second interface 526 transmits the request. For example, the second interface 526 converts the request to a physical signal and then transmits to the outside so as to transfer to the server 570. In the embodiment of FIG. 5, the request transmitted in the step 509 may not be transferred to the server 570 due to various failure situations (e.g., channel quality degradation, network congestion, etc.). Alternatively, the request may be transferred to the server 570 over the wireless LAN network and the core network.

In step 511, the first interface 524 receives a response from the server 570. The response corresponds to the request transmitted in the step 505. That is, prior to a response to the request transmitted through the second interface 526, the response corresponding to the request transmitted through the first interface 524 is first received.

In step 513, the first interface 524 transfers the response to the request/response handler 514. Thus, the request/response handler 514 may recognize that the response corresponding to the request transmitted through the first interface 524 is received first.

In step 515, the request/response handler 514 transfers the response to the application 512. When the request is retransmitted as stated above, the request/response handler 514 transfers the first received response of responses received through the multiple interfaces, to the application 512. In FIG. 5, since the response is first received through the first interface 524, the response received through the first interface 524 is transferred to the application 512.

As shown in the embodiment of FIG. 5, the re-request timer value may be set using the parameter α, and the request may be retransmitted according to the re-request timer value. According to the characteristic of the application, a separate additional procedure may be required prior to the request transmission. For example, a TCP connection establishment procedure may be required. Since the additional procedure also may cause the service delay, a re-request timer for the additional procedure may be further defined. In this case, a plurality of dynamic parameters may be used. An embodiment for using the multiple dynamic parameters is shown in FIG. 6.

Figure 6:
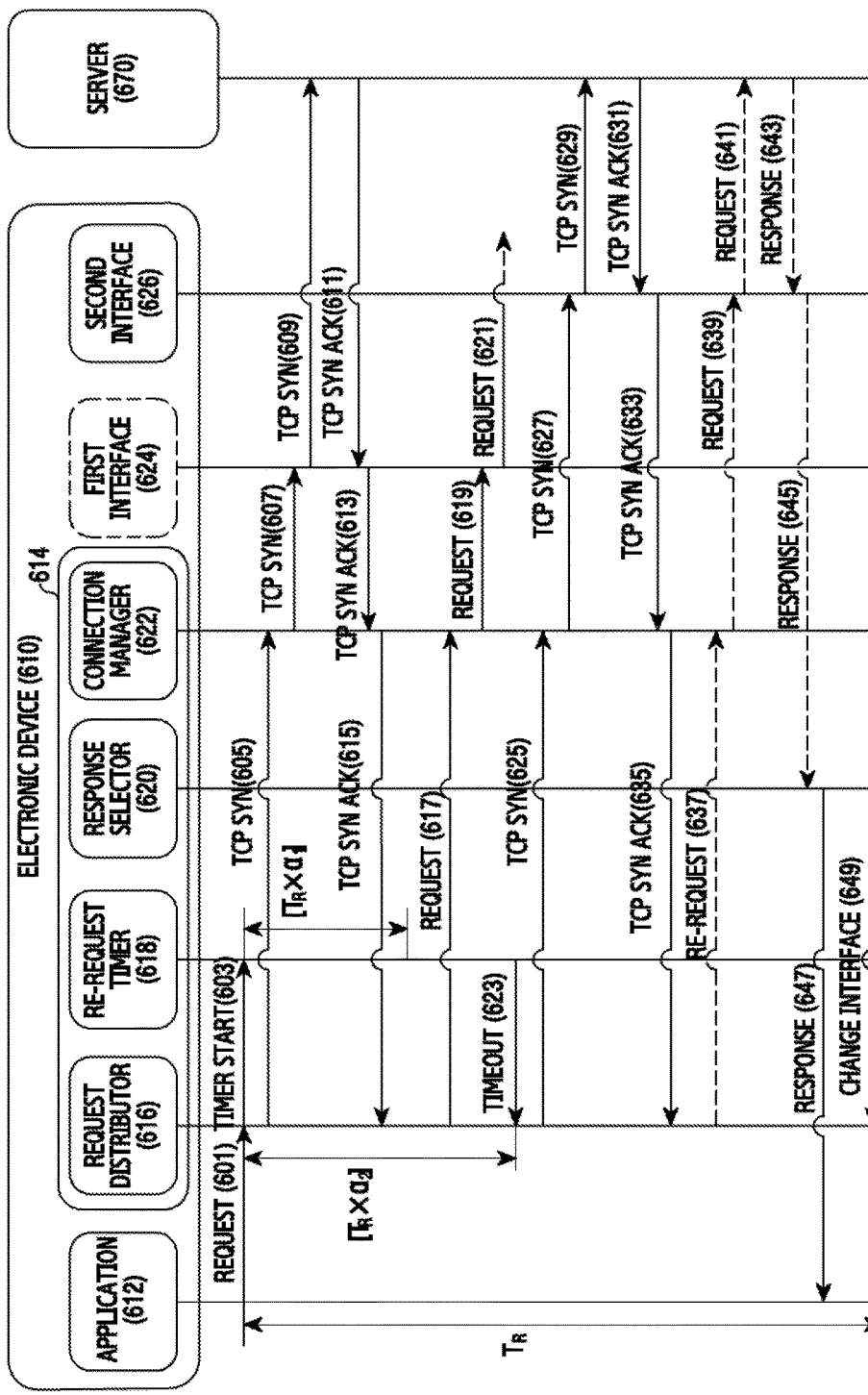
FIG. 6 illustrates signal exchange for processing a request using multiple interfaces in an electronic device according to another embodiment of the present invention.

FIG. 6 illustrates signal exchange for processing a request using multiple interfaces in an electronic device according to another embodiment of the present invention.

Referring to FIG. 6, in step 601, an application 612 of the electronic device 601 generates a request and transfers the request to a request distributor 616 of a request/response handler 614. In this case, a re-request timer value is counted.

In step 603, the request distributor 616 instructs a re-request timer 618 to start the timer. Thus, the re-request timer value is counted. Herein, the re-request timer value includes a first timer value for the TCP connection procedure and a second timer value for the request-response procedure. The first timer value is determined as the product of the response timer value $T_R$ and the parameter $α_1$ for the TCP connection procedure, and the second timer value is determined as the product of the response timer value $T_R$ and the parameter $α_2$ for the request-response procedure.

In step 605, the request distributor 616 transfers TCP SYN to a connection manager 622. In step 607, the connection manager 622 transfers the TCP SYN to a first interface 624. In step 609, the first interface 624 transfers the TCP SYN to the server 670. That is, through the step 605 through the step 609, the establishment of the TCP connection for transmitting the request through the first interface 624 between the electronic device 610 and the server 670 is requested. That is, the first interface 624 is the basic interface of the electronic device 610.

Next, in step 611, the second interface 626 receives TCP SYN ACK from the server 670. In step 613, the second interface 626 transfers the TCP SYN ACK to the connection manager 622. In step 615, the connection manager 622 transfers the TCP SYN ACK to the request distributor 616. Through the step 611 through the step 615, the successful TCP connection establishment is confirmed. In this case, since the TCP SYN ACK is received before the first timer value expires, the request transmission through the first interface 624 is feasible.

In step 617, the request distributor 616 transfers the request to the connection manager 622. In step 619, the connection manager 622 transfers the request to the first interface 624. In step 621, the first interface 624 transmits the request. For example, the first interface 624 converts the request to a physical signal and then transmits to the outside so as to transfer to the server 670. In the embodiment of FIG. 6, the request transmitted in the step 605 may not be transferred to the server 670 due to various failure situations (e.g., channel quality degradation, network congestion, etc.). Alternatively, the request may be transferred to the server 670 over a wireless LAN network and a core network.

In step 623, the re-request timer 618 notifies the timeout to the request distributor 616. That is, since a response for the request is not received until the second timer value expires, the re-request timer 618 declares the timeout. Hence, the request transmission procedure through the second interface 626 is performed.

In step 625, the request distributor 616 transfers TCP SYN to the connection manager 622. In step 627, the connection manager 622 transfers the TCP SYN to the second interface 626. In step 629, the second interface 626 transfers the TCP SYN to the server 670. That is, through the step 626 through the step 629, the TCP connection establishment for transferring the request through the second interface 626 between the electronic device 610 and the server 670 is requested.

Next, in step 631, the second interface 624 receives TCP SYN ACK from the server 670. In step 633, the second interface 624 transfers the TCP SYN ACK to the connection manager 622. In step 635, the connection manager 622 transfers the TCP SYN ACK to the request distributor 616. Through the step 631 through the step 635, the successful TCP connection establishment is confirmed.

In step 637, the request distributor 616 transfers a re-request to the connection manager 622. In step 639, the connection manager 622 transfers a request to the second interface 626. In step 641, the second interface 626 transmits the request. The request of the step 617 and the re-request of the step 637 originate from the single request generated by the application 612 in the step 601.

In step 643, the second interface 626 receives a response from the server 670. The response corresponds to the request transmitted in the step 641. In step 645, the second interface 626 transfers the response to the response selector 620. Thus, the response selector 620 may recognize that the response corresponding to the request transmitted through the second interface 626 is received first. In step 647, the response selector 620 transfers the response to the application 612.

Figure 7:
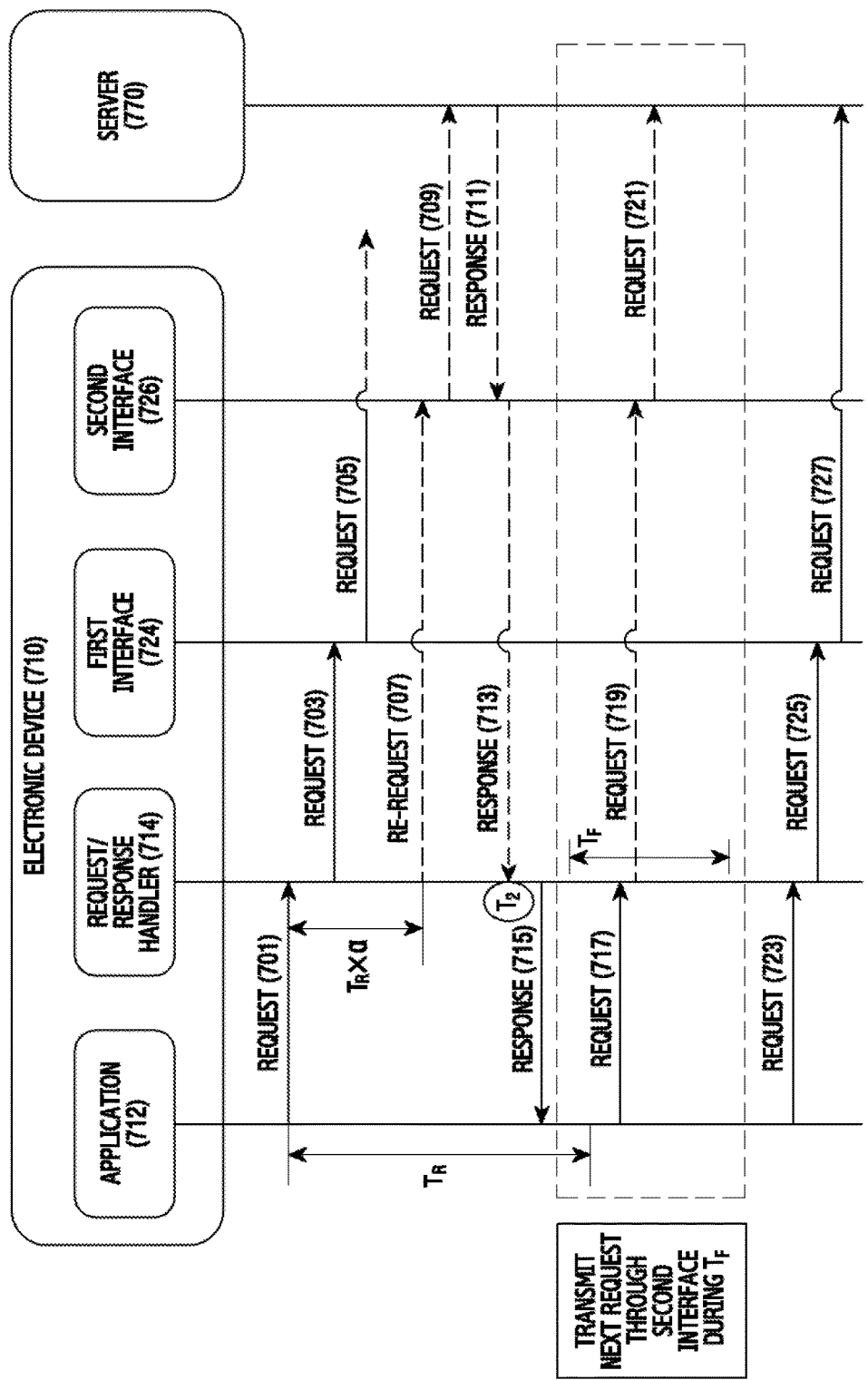
FIG. 7 illustrates signal exchange for processing a request using multiple interfaces in an electronic device according to yet another embodiment of the present invention.

FIG. 7 illustrates signal exchange for processing a request using multiple interfaces in an electronic device according to yet another embodiment of the present invention.

Referring to FIG. 7, in step 701, an application 712 of the electronic device 701 generates a request and transfers the request to a request/response handler 714. In this case, a re-request timer value is counted. The re-request timer value may be expressed as the product of the waiting time for declaring the timeout and the parameter for the re-request. Hereafter, to ease the understanding, the timer for counting the waiting time to declare the timeout is referred to as a response timer. That is, the re-request timer value is determined as the product of the response timer value $T_R$ and the parameter α.

In step 703, the request/response handler 714 transfers the request to the first interface 724. That is, the first interface 724 is a basic interface of the electronic device 710. For example, the first interface 724 may be a means for accessing the wireless LAN.

In step 705, the first interface 724 transmits the request. For example, the first interface 724 converts the request to a physical signal and then transmits to the outside so as to transfer to a server 770. In the embodiment of FIG. 7, the request transmitted in the step 705 may not be transferred to the server 770 due to various failure situations (e.g., channel quality degradation, network congestion, etc.). Alternatively, the request may be transferred to the server 770 over a wireless LAN network and a core network.

In step 707, the request/response handler 714 transfers a re-request to the second interface 726. For example, the second interface 726 may be a means for accessing the cellular network. That is, since a response of the request transmitted through the first interface 724 is not received until the re-request timer expires, the request is retransmitted. In this case, the request of the step 703 and the re-request of the step 707 originate from the single request generated by the application 712 in the step 701.

In step 709, the second interface 726 transmits the request. For example, the second interface 726 converts the request to a physical signal and then transmits to the outside so as to transfer to the server 770. In the embodiment of FIG. 7, the request transmitted in the step 709 may not be transferred to the server 770 due to various failure situations (e.g., channel quality degradation, network congestion, etc.). Alternatively, the request may be transferred to the server 770 over the wireless LAN network and the core network.

In step 711, the second interface 726 receives a response from the server 770. The response corresponds to the request transmitted in the step 709. That is, prior to a response corresponding to the request transmitted through the first interface 724, the response corresponding to the request transmitted through the second interface 726 is received first.

In step 713, the second interface 726 transfers the response to the request/response handler 714. The request/response handler 714 receives the response at a time $T_2$. Hence, the request/response handler 714 may recognize that the response corresponding to the request transmitted through the second interface 726 is first received.

In step 715, the request/response handler 714 transfers the response to the application 712. That is, since the response is received first through the second interface 726, the response received through the second interface 726 is transferred to the application 712. Hence, a request newly generated during a predefined time is processed through the second interface 726. In FIG. 7, the predefined time is expressed as $T_F$.

In step 717, the application 712 generates a request and transfers the request to the request/response handler 714. The request generates within the time $T_F$. Although not depicted in FIG. 7, a response timer value may be counted.

In step 719, the request/response handler 714 transfers the request to the second interface 726. That is, since the request generates within the time $T_F$, the request is transferred to the second interface 726.

In step 721, the second interface 726 transmits the request. For example, the second interface 726 converts the request to a physical signal and then transmits to the outside so as to transfer to the server 770. Although not depicted in FIG. 7, the second interface 726 may receive a response from the server 770.

In step 723, the application 712 generates a request and transfers the request to a request/response handler 714. The request generates after the time $T_F$. Although not depicted in FIG. 7, the response timer value is counted.

In step 725, the request/response handler 714 transfers the request to the first interface 724. That is, since the request generates after the time $T_F$, the request is transferred to the first interface 724.

In step 727, the first interface 724 transmits the request. For example, the first interface 724 converts the request to a physical signal and then transmits to the outside so as to transfer to the server 770. Although not depicted in FIG. 7, the first interface 724 may receive a response from the server 770.

As explained in reference to FIG. 7, the request generated during the certain time may be transferred to the second interface 726. This is because a request transferred to the basic interface is lost and thus the user QoE is not satisfied. In brief, after a first request is transferred to the first interface 724 which is the basic interface, when the re-request timer value expires, the same request is transferred to the second interface 726. Since the response to the request transmitted through the second interface 726 is received before the timeout is declared, the request is transferred to the second interface 726 during the next time $T_F$.

According to the embodiment of FIG. 7, when the request through the second interface 726 succeeds, the second interface 726 is used as the basic interface during the certain time $T_F$. According to another embodiment of the present invention, the time duration where the second interface 726 is used as the basic interface may be dynamically determined. For example, the time duration may be determined until the request through the second interface 726 fails and the request through the first interface 724 succeeds. In this case, when the request through the second interface 726 succeeds and the second interface is used as the basic interface, the second interface 726 may be used as the basic interface until the request through the second interface 726 fails and the request through the first interface 724 succeeds.

Figure 8:
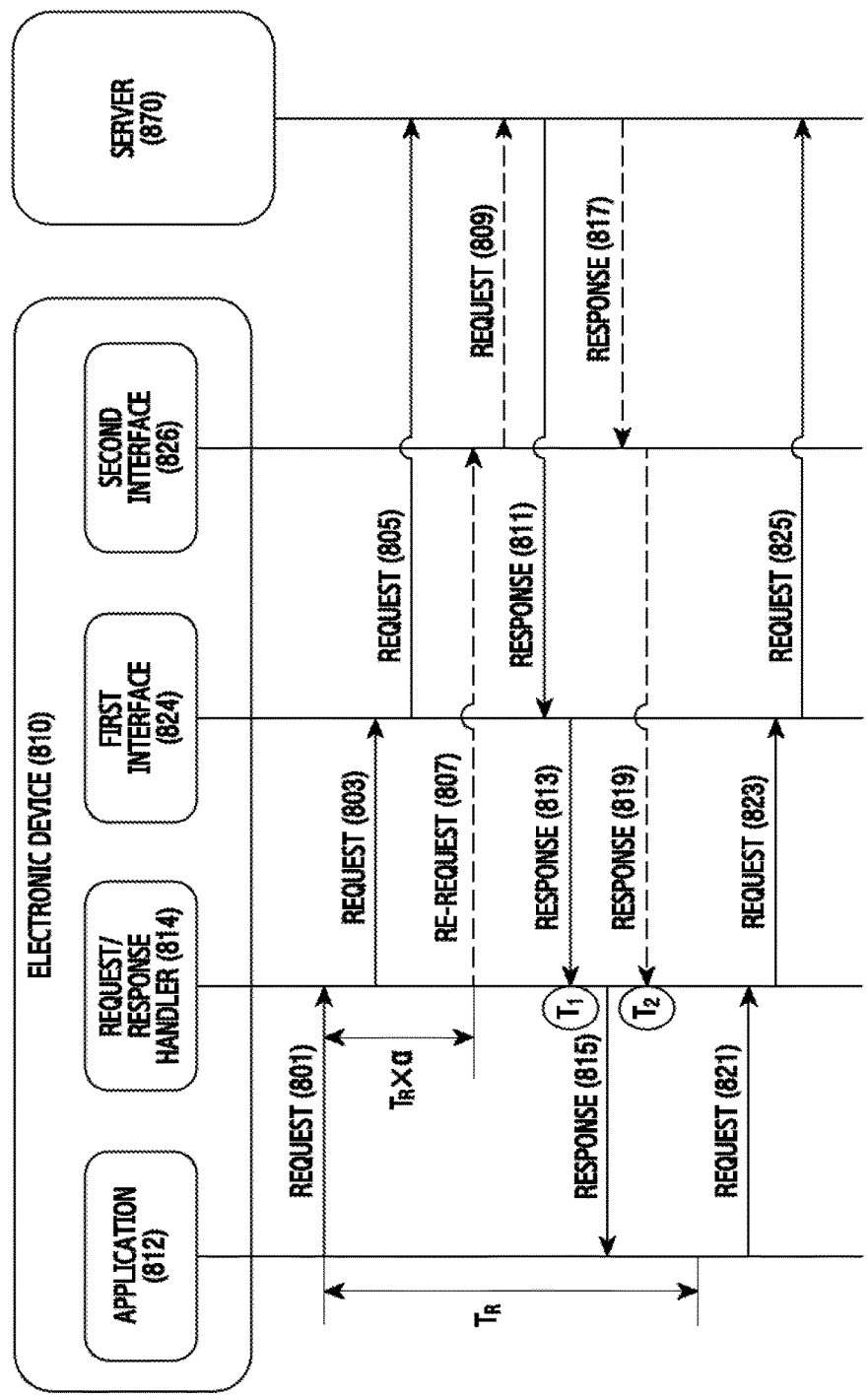
FIG. 8 illustrates signal exchange for processing a request using multiple interfaces in an electronic device according to still another embodiment of the present invention.

FIG. 8 illustrates signal exchange for processing a request using multiple interfaces in an electronic device according to still another embodiment of the present invention.

Referring to FIG. 8, in step 801, an application 812 of the electronic device 810 generates a request and transfers the request to a request/response handler 814. In this case, a re-request timer value is counted. The re-request timer value may be expressed as the product of the waiting time for declaring the timeout and the parameter for the re-request. Hereafter, to ease the understanding, the timer for counting the waiting time to declare the timeout is referred to as a response timer. That is, the re-request timer value is determined as the product of the response timer value $T_R$ and the parameter $\alpha$.

In step 803, the request/response handler 814 transfers the request to the first interface 824. That is, the first interface 824 is a basic interface of the electronic device 810. For example, the first interface 824 may be a means for accessing the wireless LAN.

In step 805, the first interface 824 transmits the request. For example, the first interface 824 converts the request to a physical signal and then transmits to the outside so as to transfer to a server 870. In the embodiment of FIG. 8, the request transmitted in the step 805 may not be transferred to the server 870 due to various failure situations (e.g., channel quality degradation, network congestion, etc.). Alternatively, the request may be transferred to the server 870 over a wireless LAN network and a core network.

In step 807, the request/response handler 814 transfers a re-request to the second interface 826. For example, the second interface 826 may be a means for accessing the cellular network. That is, since a response of the request transmitted through the first interface 824 is not received until the re-request timer expires, the request is retransmitted. In this case, the request of the step 803 and the re-request of the step 807 originate from the single request generated by the application 812 in the step 801.

In step 809, the second interface 826 transmits the request. For example, the second interface 826 converts the request to a physical signal and then transmits to the outside so as to transfer to the server 870. In the embodiment of FIG. 8, the request transmitted in the step 809 may not be transferred to the server 870 due to various failure situations (e.g., channel quality degradation, network congestion, etc.).

Alternatively, the request may be transferred to the server 870 over the wireless LAN network and the core network.

In step 811, the first interface 824 receives a response from the server 870. The response corresponds to the request transmitted in the step 805. That is, prior to a response corresponding to the request transmitted through the second interface 826, the response corresponding to the request transmitted through the first interface 824 is first received.

In step 813, the first interface 824 transfers the response to the request/response handler 814. Thus, the request/response handler 814 may recognize that the response corresponding to the request transmitted through the first interface 824 is received first.

In step 815, the request/response handler 814 transfers the response to the application 812. When the request is retransmitted as described above, the request/response handler 814 transfers the response received first among responses received through the multiple interfaces, to the application 812. In FIG. 8, since the response is received first through the first interface 824, the response received through the first interface 824 is transferred to the application 812.

In step 817, the second interface 826 receives a response from the server 870. The response corresponds to the request transmitted in the step 809. That is, after the response corresponding to the request transmitted through the first interface 824 is received, the response corresponding to the request transmitted through the second interface 826 is received.

In step 819, the second interface 826 transfers the response to the request/response handler 814. Thus, the request/response handler 814 receives the response at a time $T_2$. Hence, the request/response handler 814 may recognize that the response corresponding to the request transmitted through the second interface 826 is first received. Accordingly, the request/response handler 814 does not transfer the response provided from the second interface 826, to the application 812.

In step 821, the application 812 generates a new request and transfers the request to the request/response handler 814. Although not depicted in FIG. 8, a response timer value may be counted. Also, although not depicted in FIG. 8, a re-request timer value may be counted.

In step 823, the request/response handler 814 transfers the request to the first interface 824. That is, since the previous request-response procedure is successfully performed through the first interface 824 which is the basic interface, the request is transferred to the first interface 824.

In step 825, the first interface 824 transmits the request. For example, the first interface 824 converts the request to a physical signal and then transmits to the outside so as to transfer to the server 870. Although not depicted in FIG. 8, the first interface 824 may receive a response from the server 870.

As explained in reference to FIG. 8, the request may be continually transmitted through the first interface 824. In brief, after the request is repeatedly transmitted to the first interface 824 and the second interface 826 respectively, the response through the first interface 824 is received at the time $T_1$ and the response through the second interface 826 is received at the time $T_2$. In this case, since $T_1$ precedes $T_2$, the response through the first interface 824 is transferred to the application 812. That is, since the user QoE may be satisfied through the first interface 824, later requests are transmitted through the first interface 824 which is the basic interface.

Figure 9:
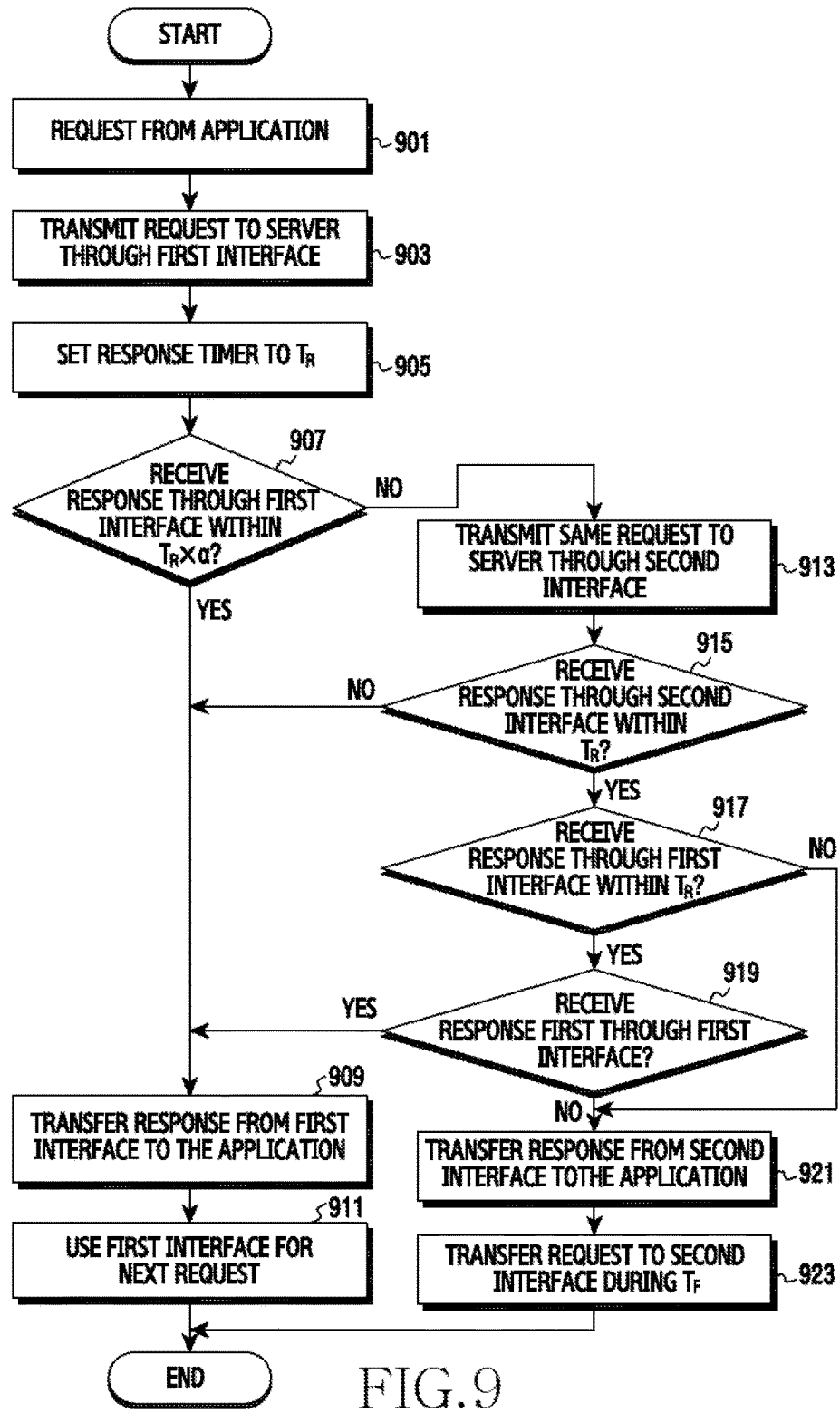
FIG. 9 illustrates an operation procedure of an electronic device according to an embodiment of the present invention.

FIG. 9 illustrates an operation procedure of an electronic device according to an embodiment of the present invention.

Referring to FIG. 9, the electronic device recognizes a request generated from an application in step 901. The request may be generated during execution of the application or by a user input. Details of the request may vary according to the application type, and a protocol used by the application. For example, when the application is a web browser, the request may be a content (e.g., HTML, image, etc.) request. The request may originate from not only the application but also a library.

Next, the electronic device transmits the request to a server through a first interface in step 903. The electronic device includes a plurality of interfaces for the communication, and the first interface is designated as a basic interface. Referring to the structure of FIG. 3, the request may be transferred to the request/response handler and the request distributor may transfer the request to the first interface. In this case, information about the request may be stored in the request distributor.

In step 905, the electronic device sets a response timer to $T_R$ in step 905. The response timer is a value defined to declare the timeout. When not receiving a response of the request until the response time expires, the electronic device may declare the timeout. That is, the electronic device may set the response timer to $T_R$ and waits for the response.

Next, the electronic device checks whether a response is received through the first interface within a time $T_R \times \alpha$ in step 907. $\alpha$ is a parameter defined for the request retransmission. That is, $T_R \times \alpha$ is a re-request timer value, and a timer for counting the retransmission timer value is referred to as a retransmission timer. According to various embodiments of the present invention, α may be used as a fixed value or a value adaptively changing.

When receiving the response through the first interface within the retransmission timer value, the electronic device transfers the response received through the first interface to the application in step 909. In other words, the electronic device transfers the response to an application which generates the request.

Next, the electronic device uses the first interface for a next request in step 911. Since the request-response procedure through the first interface is fulfilled without considerable delay or the timeout, the electronic device keeps using the basic interface without changing the interface.

By contrast, in the step 907, when not receiving the response through the first interface within the retransmission timer value, the electronic device transmits the same request to the server through the second interface in step 913. In other words, the electronic device retransmits the request through the second interface. The second interface indicates a physical communication means for accessing a communication network which is different from the first interface. For example, the first interface may be the communication means for the wireless LAN, and the second interface may be the communication means for the cellular network. Referring to the structure of FIG. 3, the request distributor transfers the same request to the second interface.

Next, the electronic device checks whether a response is received through the second interface within $T_R$ in step 915. When not receiving the response through the second interface within $T_R$, the electronic device proceeds to the step 909. By contrast, when receiving the response through the second interface within $T_R$, the electronic device proceeds to the following step 917.

The electronic device checks whether a response is received through the second interface within $T_R$ in step 917. When receiving the response through the second interface within $T_R$ and not receiving a response through the first interface, the electronic device proceeds to the step 921.

By contrast, when receiving the response through the first interface within $T_R$, the electronic device checks whether a response is first received through the first interface in step 919. In other words, when receiving responses through both of the first interface and the second interface within $T_R$, the electronic device compares a reception time of the two responses. When the response through the first interface is received first, the electronic device proceeds to the step 909.

By contrast, when the response through the second interface is received first, the electronic device transfers the response received through the second interface to the application in step 921. In other words, the electronic device transfers the response to the application which generates the request.

Next, the electronic device transfers a request generated during the time $T_F$ to the second interface in step 923. That is, during the time $T_F$, the second interface is designated as the basic interface. When the time $T_F$ passes, the electronic device switches the first interface back to the basic interface.

In the embodiment described in reference to FIG. 9, when the response is not received within the time $T_R \times \alpha$, the second interface is used. By contrast, the switch to the second interface may not be performed when the response is received through the basic interface within the time $T_R \times \alpha$, when the timeout is declared for the request transmitted through the second interface, or when the response through the first interface is received before the response through the second interface.

Figure 10:
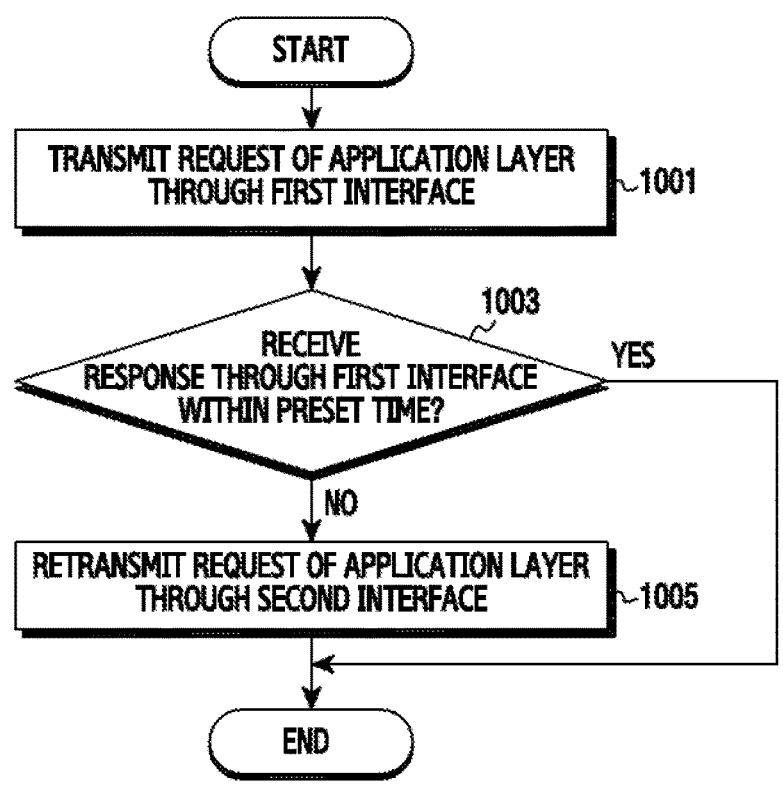
FIG. 10 illustrates an operation procedure of an electronic device according to another embodiment of the present invention.

FIG. 10 illustrates an operation procedure of an electronic device according to another embodiment of the present invention.

Referring to FIG. 10, the electronic device transmits a request of an application layer through a first interface in step 1001. Specific purpose and aim of the request may vary according to the application which generates the request. For example, the request may include a content request according to HTTP, a file transfer request according to FTP, and the like. The request is transmitted to a server which provides a corresponding service.

Next, the electronic device determines whether a response is received through the first interface within a preset time in step 1003. For doing so, after generating the request, the electronic device may start a timer for counting the time. For example, the timer may be referred to as a re-request timer. In other words, the electronic device determines whether a response corresponding to the request is received through the first interface before the re-request timer expires.

When receiving no response corresponding to the request through the first interface within the preset time, the electronic device retransmits the request of the application layer through the second interface in step 1005. That is, the electronic device transmits the same request through the second interface which is different from the first interface. The first interface and the second interface are means for accessing different communication networks. The request transmitted in the step 1001 and the request transmitted in the step 1005 originate from the single request generated in the application.

The embodiment of FIG. 10 illustrates the procedure for transmitting and retransmitting the request. When an additional procedure is required for the request transmission, the electronic device may perform the additional procedure through the second interface for the request transmission. For example, the additional procedure may include a TCP connection establishment procedure. In this case, according to other embodiment of the present invention, a timer for the TCP connection establishment procedure may be applied. The timer for the TCP connection establishment procedure may be referred to as a first re-request timer, and the timer used in the step 1003 may be referred to as a second re-request timer. More specifically, after transmitting a message for the TCP connection establishment through the first interface, when receiving no response to the TCP connection establishment before the first re-request timer expires, the electronic device may perform the TCP connection establishment procedure through the second interface without transmitting the request of the application layer.

Figure 11:
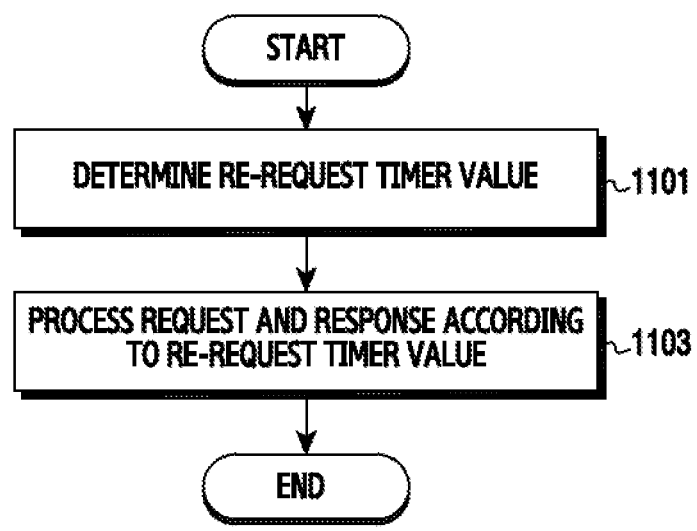
FIG. 11 illustrates an operation procedure of an electronic device according to yet another embodiment of the present invention.

FIG. 11 illustrates an operation procedure of an electronic device according to yet another embodiment of the present invention.

Referring to FIG. 11, the electronic device determines a re-request timer value in step 1101. The re-request timer value may be determined based on a response timer defined to declare the timeout in an application and a set parameter. For example, when the re-request timer value is defined as a product of the response timer and the set parameter, the set parameter is a real number greater than zero and smaller than 1. According to an embodiment of the present invention, the re-request timer and/or the set parameter may be defined as a fixed value. According to another embodiment of the present invention, the re-request timer and/or the set parameter may be defined as a dynamic value. For example, the re-request timer and/or the set parameter may be determined based on at least one of a purpose of the request, the type of the application which generates the request, a current state (e.g., a buffer state) of a service relating to the application, and a channel quality of the basic interface. A specific value of the re-request timer and/or the set parameter may be determined using a predefined table or a formularized function.

Next, the electronic device processes a request and a response of the application layer generated by the application according to the re-request timer value in step 1103. For example, when receiving no response corresponding to the request transmitted through the first interface before the re-request timer expires, the electronic device retransmits the request through the second interface.

Figure 12:
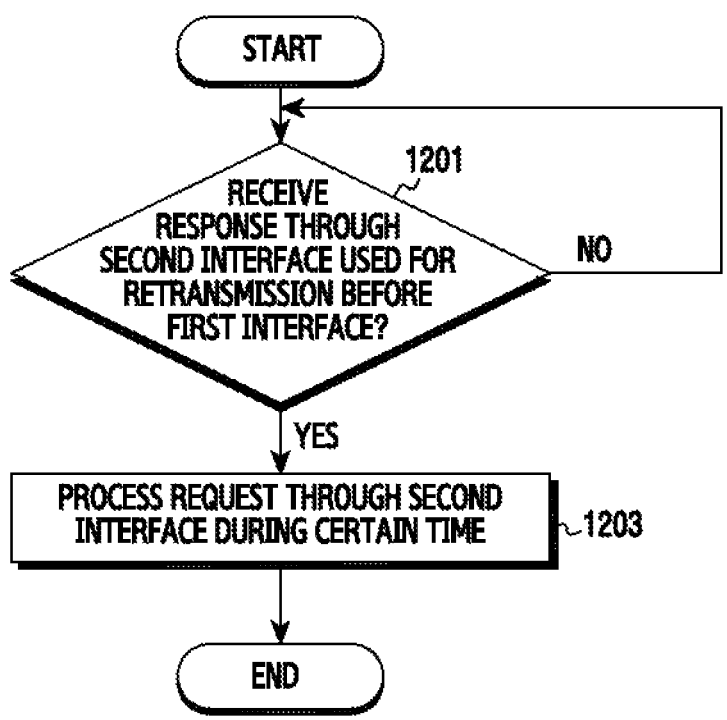
FIG. 12 illustrates an operation procedure of an electronic device according to still another embodiment of the present invention.

FIG. 12 illustrates an operation procedure of an electronic device according to still another embodiment of the present invention.

Referring to FIG. 12, the electronic device determines whether a response is received through a second interface used for retransmission before a first interface in step 1201. The electronic device retransmits a request of an application layer through the second interface due to re-request timer expiration, and receives a response corresponding to the request. When the re-request timer expiration results from the processing delay, rather than the request loss, a response corresponding to the request transmitted through the first interface may be received. That is, the electronic device determines whether a response is received only through the second interface, or whether a response is received through the second interface before a response through the first interface.

Upon receiving the response first through the second interface, the electronic device processes a request through the second interface during a certain time in step 1203. In other words, the electronic device transmits an application layer request newly generated during the certain time through the second interface, rather than the first interface which is the basic interface. That is, the second interface is temporarily used as the basic interface. A length of the certain time may be variously defined according to a specific embodiment.

Figure 13:
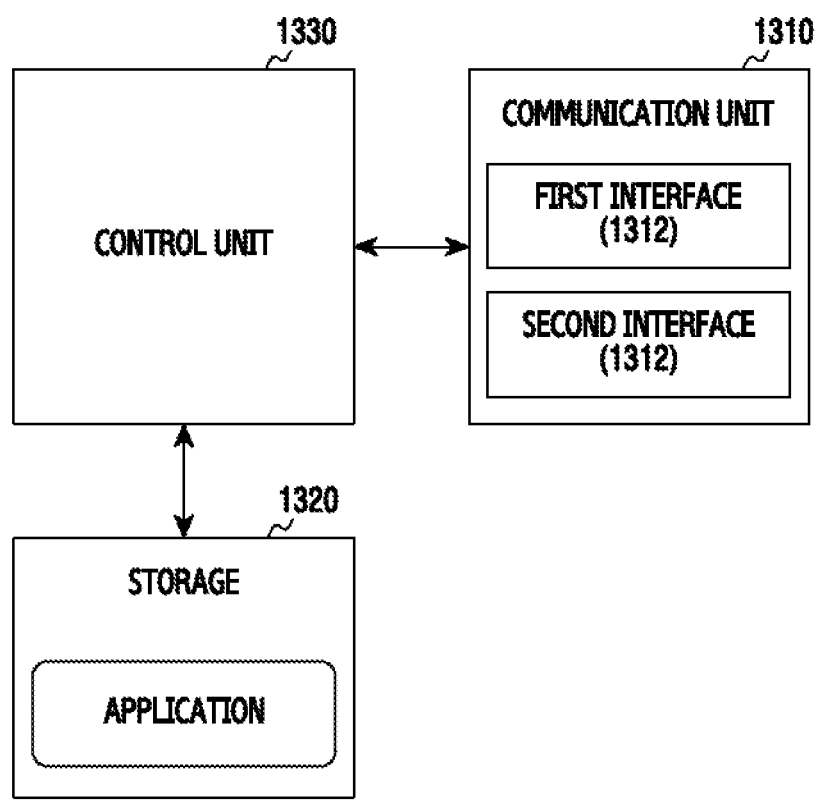
FIG. 13 illustrates a block diagram of an electronic device according to an embodiment of the present invention.

FIG. 13 illustrates a block diagram of an electronic device according to an embodiment of the present invention. FIG. 13 illustrates a structure of the electronic device 210 of FIG. 2, the electronic device 310 of FIG. 3, the electronic device 410 of FIG. 4, the electronic device 510 of FIG. 5, the electronic device 610 of FIG. 6, the electronic device 710 of FIG. 7, or the electronic device 810 of FIG. 8.

Referring to FIG. 13, the electronic device includes a communication unit 1310, a storage unit 1320, and a control unit 1330.

The communication unit 1310 provides interfaces for the electronic device to communicate with other devices. The communication unit 1310 may support at least one of wireless communication and wired communication. For example, the communication unit 1310 may perform a function for converting a baseband signal and a bit stream according to a physical layer standard of a system, and a function for transmitting and receiving signals over a radio channel such as signal band conversion and amplification for the wireless communication. For example, the communication unit 310 may include a transmit filter, a receive filter, a mixer, an oscillator, a Digital to Analog Convertor (DAC), an Analog to Digital Convertor (ADC), and the like. According to an embodiment of the present invention, the communication unit 310 includes at least two or more interfaces such as a first interface 1312 and a second interface. For example, the first interface 1312 may be a means for accessing the wireless LAN, and the second interface may be a means for accessing the cellular network. The communication unit 310 may be divided into and referred to as a transmitting unit and a receiving unit.

The storage unit 1320 stores a basic program for the operations of the electronic device, an application program, and data such as setting information. Also, the storage unit 1320 may store at least one application for the service of the application layer. Also, the storage unit 1320 provides the stored data according to a request of the control unit 1330. According to an embodiment of the present invention, the storage unit 1320 may store an instruction set for defining a re-request timer for retransmitting the request of the application layer, determining the re-request timer value, and performing a re-request function which retransmits the request according to the re-request timer. For example, the instruction set may include instructions for performing the functions of the request/response handler 314 of FIG. 3. The instruction set may be executed by the control unit 1330, and may be referred to as a program or an application. According to another embodiment of the present invention, when the re-request function is implemented as hardware, the instruction set may not be stored.

The control unit 1330 controls overall operations of the electronic device. For example, the control unit 1330 transmits and receives signals through the communication unit 310. Also, the control unit 1330 records and reads data to and from the storage unit 1330, and executes the application stored in the storage unit 1330. For doing so, the control unit 1330 may include at least one processor. According to one embodiment of the present invention, the control unit 1330 may execute the instruction set for executing the re-request function stored in the storage unit 1320. According to another embodiment of the present invention, the control unit 1330 may include a hardware component for performing the re-request function. For example, the control unit 1330 may control the electronic device to operate as the electronic device 210 of FIG. 2, the electronic device 310 of FIG. 3, the electronic device 410 of FIG. 4, the electronic device 510 of FIG. 5, the electronic device 610 of FIG. 6, the electronic device 710 of FIG. 7, or the electronic device 810 of FIG. 8, or to perform the procedure of FIG. 9, FIG. 10, FIG. 11, or FIG. 12. For example, the operations of the control unit 1330 according to the embodiments of the present invention are as follows.

According to the embodiments of the present invention, the control unit 1330 determines the re-request timer value. The re-request timer value may be determined based on the response timer defined to declare the timeout in the application and the set parameter. The re-request timer and/or the set parameter may be defined as a fixed value or a dynamic value. For example, the re-request timer and/or the set parameter may be determined based on at least one of the purpose of the request, the type of the application which generates the request, the current state (e.g., the buffer state) of the service relating to the application, and the channel quality of the basic interface.

According to the embodiments of the present invention, the control unit 1330 transmits the request of the application layer through the first interface 1312. In this case, after the request occurs, the control unit 1330 starts the re-request timer for counting the time. When receiving no response corresponding to the request through the first interface 1312 before the re-request timer expires, the control unit 1330 retransmits the request of the application layer through the second interface 1314. The request transmitted through the first interface 1312 and the request transmitted through the second interface 1314 originate from the single request generated by the application. When an additional procedure is required for the request transmission, the control unit 1330 may perform the additional procedure through the second interface 1314 for the request transmission. For example, the additional procedure may include the TCP connection establishment procedure.

According to the embodiments of the present invention, the control unit 1330 determines whether a response is received through the second interface 1314 used for retransmission before the first interface 1312. Upon receiving the response first through the second interface 1314, the control unit 1330 processes the request through the second interface 1314 during a certain time. In other words, the control unit 1330 transmits an application layer request newly generated during the certain time through the second interface 1314, rather than the first interface 1312 which is the basic interface. That is, the second interface 1314 is temporarily used as the basic interface. The length of the certain time may be variously defined according to a specific embodiment.

According to the above-stated various embodiments of the present invention, by modifying only an electronic device framework, it is possible to determine whether the corresponding interface may satisfy the user's QoE based on the request of the application and the response time. Also, by retransmitting the request through the multiple interfaces, the embodiments of the present invention may select an adequate interface, enhance responsiveness, and provide the seamless service. Various embodiments of the present invention may be performed in the electronic device of the user, and enhance the QoE without changing an existing application and without user's intervention.

The methods according to the embodiments described in the claims or the specification of the present invention may be implemented in hardware, software, or as a combination of hardware and software.

When implemented in software, a computer-readable storage medium storing one or more programs (software modules) may be provided. One or more programs stored in the computer-readable storage medium are configured for execution by one or more processors in an electronic device. The one or more programs include instructions for making the electronic device execute the methods according to the embodiments described in the claims or the specification of the present invention.

Such a program (software module, software) may be stored in a random access memory, a non-volatile memory including a flash memory, a Read Only Memory (ROM), an Electrically Erasable Programmable Read Only Memory (EEPROM), a magnetic disk storage device, a Compact Disc-ROM (CD-ROM), Digital Versatile Discs (DVDs) or optical storage devices of other type, and a magnetic cassette. Alternatively, it may be stored in a memory combining some or all of them. In addition, a plurality of memories may be included.

In addition, the program may be stored in an attachable storage device which may access through a communication network such as Internet, Intranet, local area network (LAN), Wireless LAN (WLAN), or Storage Area Network (SAN), or a communication network including a combination of them. Such a storage device may access the electronic device which realizes the embodiments of the present invention via an external port. In addition, a separate storage device on the communications network may access a device which realizes the embodiments of the present invention.

In the above-described specific embodiments of the present invention, the elements included in the invention are expressed in a singular or plural form according to the specific embodiment. However, the singular or plural expression is appropriately selected according to a proposed situation for the convenience of explanation, and the disclosure is not limited to a single element or a plurality of elements. The elements expressed in the plural form may be configured as a single element, and the elements expressed in the singular form may be configured as a plurality of elements.

While a concrete exemplary embodiment has been described in a detailed description of the present invention, it is undoubted that various modifications are possible without departing from the scope of the present invention. Therefore, the scope of the present invention should not be limited and defined by the described exemplary embodiment and should be defined by not only the scope of claims described later but also equivalents to this scope of the claims.

The invention claimed is:

1. A method for operating an electronic device, comprising:
    determining a value of a timer;
    transmitting a request signal through a first interface; and
    when a response signal corresponding to the request signal is not received before the timer expires, transmitting another request signal through a second interface,
    wherein the request signal and the another request signal correspond to a single request generated in the electronic device, and
    wherein the value of the timer is determined to be smaller as a channel quality of a network accessible through the first interface degrades.

2. The method of claim 1,
    wherein the value of the timer is smaller than a waiting time for declaring timeout of an application.

3. The method of claim 2, wherein the value of the timer is determined based on at least one of a purpose of the request signal, a type of an application included the electronic device, a current state of a service related to the application, and a channel quality of a network related to the first interface.

4. The method of claim 2, wherein, when the electronic device provides a realtime service, the value of the timer is determined to be smaller than an electronic device which provides a non-realtime service.

5. The method of claim 2, wherein, when the electronic device provides a streaming service, the value of the timer is determined to be smaller as an amount of buffered data reduces.

6. The method of claim 1, further comprising:
    before transmitting the request signal through the first interface, transmitting a message for Transmission Control Protocol (TCP) connection establishment through the first interface; and
    when a response signal to the TCP connection establishment is not received before a timer for TCP connection establishment expires, transmitting the message for the TCP connection establishment through the second interface.

7. The method of claim 1, further comprising:
    when a response signal corresponding to the request signal through the second interface is received before a response signal corresponding to the request signal through the first interface, transmitting a request signal generated for a predefined time duration through the second interface.

8. The method of claim 1, further comprising:
    when a response signal corresponding to the request signal through the second interface is received before a response signal corresponding to the request signal through the first interface, transmitting a request signal generated for a predefined time duration through the second interface, until the request signal transmitted through the second interface is retransmitted through the first interface and a response signal is received through the first interface.

9. The method of claim 1,
    wherein the first interface is for accessing a wireless Local Area Network (LAN), and
    wherein the second interface is for accessing a cellular network.

10. An electronic device comprising:
    a controller configured to determine a value of a timer; and
    a transceiver comprising a first interface for accessing a first network and a second interface for accessing a second network,
    wherein the transceiver is configured to:
        transmit a request signal through the first interface, and
        when a response signal corresponding to the request signal is not received before the timer expires, transmit another request signal through the second interface,
    wherein the request signal and the another request signal correspond to a single request generated in the electronic device, and
    wherein the value of the timer is determined to be smaller as a channel quality of a network accessible through the first interface degrades.

11. The electronic device of claim 10,
    wherein the value of the timer is smaller than a waiting time for declaring timeout of an application.

12. The electronic device of claim 11, wherein the value of the timer is determined based on at least one of a purpose of the request signal, a type of an application included the electronic device, a current state of a service related to the application, and a channel quality of a network related to the first interface.

13. The electronic device of claim 11, wherein, when the electronic device provides a realtime service, the value of the timer is determined to be smaller than an electronic device which provides a non-realtime service.

14. The electronic device of claim 11, wherein, when the electronic device provides a streaming service, the value of the timer is determined to be smaller as an amount of buffered data reduces.

15. The electronic device of claim 10,
wherein, before transmitting the request signal through the first interface, the transceiver is configured to:
transmit a message for Transmission Control Protocol (TCP) connection establishment through the first interface, and
when a response signal to the TCP connection establishment is not received before a timer for TCP connection establishment expires, transmit a message for the TCP connection establishment through the second interface.

16. The electronic device of claim 10, wherein, when a response signal corresponding to the request signal through the second interface is not received before a response signal corresponding to the request signal through the first interface, the transceiver is configured to transmit a request signal generated for a predefined time duration through the second interface.

17. The electronic device of claim 10, wherein, when a response signal corresponding to the request signal through the second interface is received before a response corresponding to the request signal through the first interface, the transceiver is configured to transmit a request signal generated for a predefined time duration through the second interface, until the request signal transmitted through the second interface is retransmitted through the first interface and a response signal is received through the first interface.

18. The electronic device of claim 10,
wherein the first interface is for accessing a wireless Local Area Network (LAN), and
wherein the second interface is for accessing a cellular network.

* * * * *